Oct. 31, 1939.  E. C. CHAPMAN  2,177,868

WELDED JOINT

Filed June 8, 1937

INVENTOR
EDWARD C. CHAPMAN.
BY
ATTORNEY

Patented Oct. 31, 1939

2,177,868

UNITED STATES PATENT OFFICE 2,177,868

WELDED JOINT

Edward C. Chapman, Lookout Mountain, Tenn., assignor to Combustion Engineering Company, Inc., New York, N. Y.

Application June 8, 1937, Serial No. 147,001

2 Claims. (Cl. 219—10)

The present invention relates to the art of connecting the edges of two metallic plates or sheets by electric arc welding and particularly to cases where such sheets are provided with a layer or coating of material different from the body of the sheets. Typical instances of such sheets occur in vessels used in some industrial processes where the main part of the wall of the container is steel and the inside of the vessel is lined with a protective coating of non-corrosive metal or alloy. This protective layer is either in the form of so-called cladding, i. e., it is secured to the steel so that the two are connected by a continuous bond co-extensive with the sheets or it consists of individual plates which are fitted to the vessel in abutting relation and are secured to the wall at spaced intervals by spot welding or other means. In many cases, as for example where such protective layers are nickel or where they are stainless steel of the ordinary composition, difficulties arise when joints must be made between adjacent edges of the clad or covered sheets and it is the object of the present invention to remove these difficulties.

Figure 1:
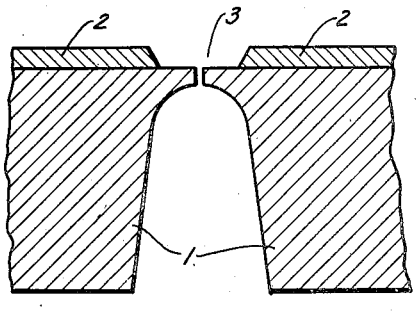
Figure 2:
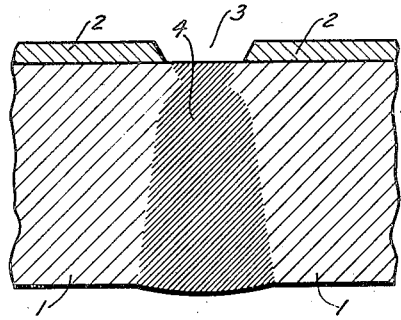
Figure 3:
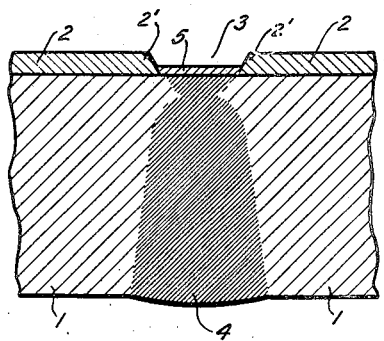
Figure 4:
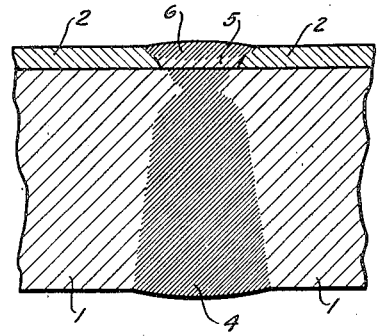

The invention will be described in connection with the drawing filed herewith in which Fig. 1 shows the edges of two adjacent plates ready for the operation of connecting them; Fig. 2 shows a later stage in which the main bodies of the sheets have been connected; Fig. 3 shows a subsequent stage, and Fig. 4 shows the completed joint.

The two edges to be joined are shown at 1—1. They may be the edges of two abutting sheets or they may be two edges of the same sheet, the sheet having been bent into the cylindrical form to make the two edges meet. The protective layers are shown at 2—2 and it will be noted that they do not quite extend to the outer edges of the sheets but that a space 3 is left devoid of such protective coating. In the case of clad sheets, the space 3 is produced by machining off the cladding for a distance back from each edge. When the layers 2—2 are sheets welded to the plates 1—1 they can be given such size at once that the requisite space 3 is left unoccupied by the protective sheets.

The edges 1—1 have been shaped by machining to the usual form for the usual arc welding operation. This welding is shown completed in Fig. 2, the two plates 1—1 being connected to each other by the weld material 4, which is preferably of the same composition as the sheets 1—1.

In order to protect this weld material 4 from corrosion, the space 3 has to be filled with protective material. If the space 3 is filled by means of arc welding with weld material of the same composition as the sheets 2, a very serious difficulty arises. In fact the difficulty is two-fold. For one thing the weld material with which the space 3 is filled becomes diluted by some weld material from 4 which melts and mingles with it. The protective property of the weld material in the space 3 thereby becomes impaired. Worse than this however is an effect which the mingling of some of the non-corrosive weld material has with the weld material 4. A slight amount of the non-corrosive weld material mingled with the weld material 4 at the points where the two fuse causes a zone of brittle material, which it is very difficult if not impossible to remove by annealing. Frequently also cracks develop in this brittle zone which no amount of annealing can remove.

It is the main object of the present invention to obviate this difficulty. For this purpose a strip 5 (see Fig. 3) of the same composition as the protective layer 2—2 is inserted in the space 3. Preferably, although not necessarily, this strip is somewhat thinner than the protective layer 2. Next, weld material of the same composition as the protective layers 2—2 and strip 5 is deposited, preferably by the arc method, connecting layers 2—2 at the point 2'—2' with the strip 5. This may be deposited in one bead or in more, as required. In Fig. 4 is shown a transverse section of the finished joint seam showing how the weld material 6 unites the layers 2—2 with the strip 5. Ordinarily this weld material 6 will protrude slightly above the protective layers 2—2 but if this is objectionable, this excess can be removed, as by grinding.

It will be noted that by this process a continuous protective coating is provided without the danger of contamination of either the protective coating or the steel sheets.

In practice there may be some variations from the exact method described and illustrated herein without sacrificing the real spirit of the invention. Thus, while the edges of the protective layers 2—2 as well as the edges of the strip 5 are shown bevelled they may, if preferred, be square. This and other variations are to be considered within the scope of the appended claims.

What I claim is:

1. A composite article comprising steel plating having opposed edges united by a joint of welding metal therebetween; a protective layer of corrosion resistant metal substantially covering the plating and having edge portions terminating short of but adjacent to the edges of said plating, the edges of said layer being beveled and inclined toward said joint; a strip of metal of the same composition as said protective layer of such width and having edges so shaped as to fit closely between and to contact the edges of said layer in overlying relation to but free from said weld joint, said strip being of lesser thickness or depth than said layer; and a body of weld metal of the same composition as said layer and strip fused to the latter and the edges of said layer and filling the space above said strip to a level substantially flush with said layer.

2. The process of uniting opposed edges of steel plates covered with a protective layer of corrosion resistant metal comprising the steps of: providing a space adjacent to each edge free of such layer of corrosion resistant metal; welding the two steel plates together; forming a strip of metal having the same composition as a protective layer of a thickness less than said layer and of a width equal to the distance between the edges of the protective layer with the edges of the strip shaped to conform to and contact with the edges of said layer; fitting the strip into the space between and in contact with the edges of said protective layer and also in contact with the steel plates and weld metal joining them; completely covering the exposed face of the strip with a body of weld metal of the same composition as the protective layer and of such depth or thickness that its outer surface is substantially flush with the outer surface of the protective layer; and fusing the weld metal to the strip and to the protective layer adjacent to the strip at each side, the strip being free from the plates and the weld metal joining them.

EDWARD C. CHAPMAN.